(12) United States Patent
Feichtinger et al.

(10) Patent No.: US 10,525,479 B2
(45) Date of Patent: Jan. 7, 2020

(54) COMMINUTING TOOL (71) Applicant: EREMA ENGINEERING RECYCLING MASCHINEN UND ANLAGEN GESELLSCHAFT M.B.H., Ansfelden (AT)

(72) Inventors: Klaus Feichtinger, Linz (AT); Manfred Hackl, Linz-Urfahr (AT); Peter Pauli, Allhaming (AT); Georg Weigerstorfer, Linz/Ebelsberg (AT)

(73) Assignee: EREMA ENGINEERING RECYCLING MASCHINEN UND ANLAGEN GESELLSCHAFT M.B.H., Ansfelden (AT)

( * ) Notice: Subject to any disclaimer, the term of this patent is extended or adjusted under 35 U.S.C. 154(b) by 533 days.

(21) Appl. No.: 15/114,830

(22) PCT Filed: Jan. 21, 2015

(86) PCT No.: PCT/AT2015/050020
§ 371 (c)(1),
(2) Date: Jul. 27, 2016

(87) PCT Pub. No.: WO2015/113089
PCT Pub. Date: Aug. 6, 2015

(65) Prior Publication Data
US 2016/0339443 A1 Nov. 24, 2016

(30) Foreign Application Priority Data
Jan. 28, 2014 (AT) .................. 50055/2014

(51) Int. Cl.
B02C 18/06 (2006.01)
B02C 18/00 (2006.01)
(Continued)

(52) U.S. Cl.
CPC .............. *B02C 18/06* (2013.01); *B02C 18/00* (2013.01); *B02C 18/08* (2013.01); *B02C 18/086* (2013.01);
(Continued)

(58) Field of Classification Search
CPC ....... B02C 18/086; B02C 18/12; B02C 18/06; B02C 18/08; B02C 18/00; B02C 13/16;
(Continued)

(56) References Cited

U.S. PATENT DOCUMENTS 3,314,617 A * 4/1967 Sargood ................. D21B 1/345
241/261.3
4,015,781 A * 4/1977 Beck ..................... B02C 18/086
241/46.11

(Continued)

FOREIGN PATENT DOCUMENTS

DE 27 24 417 A1 12/1977
EP 0123771 A1 11/1984
(Continued)

OTHER PUBLICATIONS

International Search Report dated May 12, 2015, from the corresponding International Application No. PCT/AT2015/050020, 5 pages.

(Continued)

Primary Examiner — Adam J Eiseman
Assistant Examiner — Mohammed S. Alawadi
(74) Attorney, Agent, or Firm — Kilpatrick Townsend & Stockton LLP (57) ABSTRACT The invention relates to a crushing tool for plastic materials drivable to a rotary motion, comprising a carrier (1), which can be rotated about a rotational axis (B) centrally located on it and on the surface (3) of which tools (4) for the processing and crushing of the plastic materials are arranged. It is (Continued)

provided according to the present invention, that in the area of the rotational axis (B) of the carrier (1) a deflector (5) is arranged, wherein in an area of the carrier (1) connecting radially to the deflector (5) web- or strip-shaped conveyor wings (6) are arranged and in the area of the carrier (1) connecting to the conveyor wings (6) radially towards the edge (7) the tools (5) are arranged.

32 Claims, 7 Drawing Sheets

(51) Int. Cl.
  *B02C 18/12* (2006.01)
  *B02C 18/08* (2006.01)
  *B29B 9/02* (2006.01)
  *B29B 17/04* (2006.01)
  *B29B 13/10* (2006.01)
  *B29L 31/00* (2006.01)
(52) U.S. Cl.
  CPC ............... *B02C 18/12* (2013.01); *B29B 9/02* (2013.01); *B29B 13/10* (2013.01); *B29B 17/04* (2013.01); *B29B 2017/048* (2013.01); *B29L 2031/00* (2013.01); *Y02W 30/625* (2015.05)
(58) Field of Classification Search
  CPC ..... B02C 13/17; B29B 17/04; B29B 17/0412; B29B 9/02; B29B 13/10; B29B 2017/048; A47J 43/0716; D21B 1/345; B29L 2031/00; Y02W 30/625
  USPC ............ 241/277, 199.12, 282.1, 282.2
  See application file for complete search history.

(56) References Cited

U.S. PATENT DOCUMENTS

| | | | |
|---|---|---|---|
| 4,120,460 A | | 10/1978 | Bacher |
| 5,927,624 A | * | 7/1999 | Hughes ................. B02C 18/067 |
| | | | 241/186.4 |
| 7,117,784 B2 | * | 10/2006 | de Groote ............... A47J 17/18 |
| | | | 99/508 |
| 7,726,597 B2 | * | 6/2010 | Bentley ................. B02C 13/185 |
| | | | 241/275 |
| 2013/0113139 A1 | | 5/2013 | Weigerstorfer et al. |
| 2014/0239104 A1 | | 8/2014 | Feichtinger et al. |

FOREIGN PATENT DOCUMENTS

| | | |
|---|---|---|
| JP | 2013-527051 A | 6/2013 |
| RU | 2228843 C2 | 5/2004 |
| SU | 1595654 A1 | 9/1990 |
| WO | 2011/127508 A1 | 10/2011 |
| WO | 2013/052984 A1 | 4/2013 |

OTHER PUBLICATIONS

International Preliminary Report on Patentability dated Aug. 2, 2016, from the corresponding International Application No. PCT/AT2015/050020, 15 pages.

* cited by examiner

COMMINUTING TOOL

This application is a U.S. National Phase of International Application No. PCT/AT2015/050020, filed Jan. 21, 2015, which claims priority to Austrian Patent Application No. A50055/2014, filed Jan. 28, 2014, the disclosures of which are incorporated by reference herein.

The invention relates to a crushing tool according to the preamble of patent claim 1. Such crushing tools are used particularly in cutter compactors for the processing and crushing of plastic materials. The problem addressed by such crushing tools, preferably cutting or milling tools, is, in addition to the energy input into the material and a corresponding increase of the enthalpy, to crush and/or mix the arriving material. Rotating discs or disc-like carriers or carriers fulfilling the same function can be used as carriers. Usually the tools are mounted from the edge up to the inner area, i.e. up to the rotational axis of the disc, i.e. also in those areas, in which the circumferential speed of the tools already assumes very small values. Furthermore, the invention relates to a cutter compactor with a crushing tool according to the present invention.

Studies have now revealed that in the case of blown films, cast films, small ribbons and/or fibers to be processed particularly made from polyolefins and other polymers such as PLA, PS, ABS or also PET, PA, etc. the circumferential speed of the tools, particularly cutting knives, must be sufficiently high in order to be able perform a sufficient crushing, i.e., a cutting through the material. However, in this cutting process no counter-knife is available and thus no defined cutting gap can be produced, but rather it depends essentially on the mass inertia of the materials and on the material, which presses on the particle to be cut and thus produces the counter pressure for the tool. If this cutting speed is not achieved, the cutting tool used cannot perform its function.

The problem addressed by the invention is to improve or to simplify the effect and the structure of such crushing tools. Furthermore, the movement of the material to be crushed to the tools should be accelerated and a shifting of the crushing tool with material should be prevented.

According to the present invention, in the case of a crushing tool of the type mentioned at the outset, it is provided, that in the area of the rotational axis of the carrier a deflector is arranged, wherein in an area of the carrier connecting radially to the deflector web- or strip-shaped conveyor wings are arranged and the tools are arranged in the area of the carrier connecting to the conveyor wings radially towards the edge. This deflector brings it about that in the area about the rotational axis no material can accumulate, in which area the arrangement of tools is also not required. The tools are shifted away from the rotational axis, namely into an area, in which the tools have a sufficient speed in order to crush or to cut up the uncrushed material. Thus, savings are achieved in the manufacture of the cutting compactor and crushing equipment. At the same time, the efficiency of the tools used is increased. The deflector used ensures a movement of the material to be crushed in the radial direction or towards the edge of the carrier. In the process, the material to be crushed behaves like a fluid and apart from a good mixture of the material within the container the material to be crushed is fed rapidly and efficiently to the tools, which are located in an area of the container or the carrier, in which they have their best effect.

The conveyor wings provided according to the present invention, which extend between the deflector and the tools to the carrier, permit an optimal feed of the material to be crushed to the tools and contribute to a good mixture of the crushed and to be crushed material within the container provided.

The deflector and the conveyor wings bring energy into the plastic material in order to heat the latter and at the same time serve as a radial fan in order to transport the material to be crushed radially outward into the area of the tools. Moreover, the deflector and the conveyor wings serve to reject uncrushed material, which is fed to the cutting compactor, so that this material is not imposed or jammed, but rather is fed via the deflector and the conveyor wings to the tools. Through the rapid removal of the materials to be crushed from the central area of the cutting compactor, the free surface of the materials is increased or these are broken up, so that an evaporation of the volatile substances is facilitated. The conveyor wings give the material an appropriately high circulation speed and an exchange of particles between the surface of the spout located inside the cutting compactor and its interior is increased.

The deflector is consistently centrally located on the crushing tool or on the carrier of the crushing tool and surrounds its rotational axis or lies symmetrically to the rotational axis.

It is possible, that the conveyor wings depart from the deflector and are connected to the latter. But it is not absolutely required, that the conveyor wings connect directly to the deflector. In principle, a gap can be formed between the deflector and the conveyor wings. The conveyor wings are thus located in an area, which is radially farther from the rotational axis of the crushing tool than the circumference of the deflector. Advantageously, the conveyor wings depart directly from the circumference of the deflector or can be connected to the latter by welding or being screwed together.

The tools are located in an area of the crushing tool located radially outside the area of the conveyor wings. These tools can connect directly to the conveyor wings or also connect to the conveyor wings with the formation of a distance. It is advantageously provided, that the tools are located between the end of the respective conveyor wing distant from the rotational axis and the edge of the carrier. It is constructively advantageous, if the tools connect directly to the respective conveyor wing or the tool which is further inside connects directly to the end of the respective conveyor wing distant from the rotational axis. The outermost tool can tower above the edge of the carrier. In principle, it is also possible only to provide a single tool.

A simple and stable structure results, if the carrier is formed from a disc, which bears the deflector, the conveyor wings and the tools on its surface, or is formed from a central carrier part and from a multiplicity of girders departing from this central carrier part, wherein the central carrier part supports the deflector and, if necessary, the conveyor wings and/or the girders support the conveyor wings and the tools and, if necessary, the deflector. The carrier can be formed from a disc or a disc-like component.

It is a good deflection or diversion of the material to be crushed and advantageous for the formation of the spout rotating in the cutting compactor, if the deflector has a rotationally symmetrical, preferably conical, cylindrical, truncated conical, cylindrical with conical attachment, or a pyramidal outer contour or forms a cone-bearing cylinder. In principle, other outer forms of a deflector, for example, hemispheric forms or ovoid or bossed forms are conceivable.

Advantages for the material deflection arise, if the deflector is inclined in a sloping manner from its tip lying in the rotational axis or from its area surrounding the rotational axis towards the edge of the carrier.

A simple structure and a good deflection effect of the deflector arise, if the deflector possesses a continuously closed surface or a surface formed by a number of struts and/or plates forming the outer contour and/or if the conveyor wings departing from the deflector in the direction to the edge of the carrier depart or protrude from the surface of the carrier or are mounted on the latter.

In the case of an especially advantageous embodiment it is provided that the deflector itself also bear conveyor wings, which depart or protrude from the surface of the deflector and are directed away from the carrier. Thus, the conveying effect of the conveyor wings, which lie between the deflector and the tools, is supported and the circulation of the plastic particles in the container is homogenized and accelerated.

The cross-sectional form of the conveyor wings can advantageously be rectangular. The conveyor wings are designed in the form of strips or webs and depart from the surface of the carrier and, if necessary, from the surface of the deflector.

It can be constructively advantageous, that the conveyor wings borne by the deflector and the conveyor wings placed between the deflector and the tools are connected directly to each other or are designed in one piece with each other.

It is advantageous for the operation of the crushing tool, if the starting point of the conveyor wings borne by the deflector and thus also the starting point for conveyor wings which connect to these conveyor wings and depart from the carrier, lies in the rotational axis of the carrier or in the center of the deflector or in the area between the rotational axis or the center of the deflector and the edge of the deflector at a given distance from the rotational axis. Apart from a stable structure, a good conveying effect results for the plastic material to be crushed.

The starting point of conveyor wings, which connect to the deflector, can tower above the height level of the edge of the deflector.

The circulation of the material and the effect of the tools is improved, if the conveyor wings in the area above the deflector in the direction towards the edge have a straight or a curved course trailing in respect to a radial and/or that the conveyor wings extending between the deflector and the edge of the carrier have a straight or trailing course in respect to a radial.

It can be provided for an improved conveyance of the plastic material to be crushed and an optimization of the introduction of energy into the material, that from the starting point the height of the conveyor wings or their carrier-distant surface or edge decreases with regard to the carrier up to the height of that tool, which connects to the respective conveyor wing, particularly up to the height of the cutting surface or the working surface of this tool.

The energy introduction into the material can be varied, if the carrier-distant edge of the conveyor wings in relation to the surface of the carrier has a straight or a, preferably parabolic, curved course or has straight and/or curved sections back to back.

Depending on the material and the speed of rotation, it can be provided, that the deflector has a radius of 5 to 45%, preferably of 15 to 40% of the radius of the carrier or of the radius of the turning circle of the radially outermost end area of the girders or of the radius of the turning circle of the radially furthest outside point of the outermost tool, to tower above the carrier outwardly, if necessary. Thus, an optimal deflection and crushing of the material occurs.

It has also proven to be useful for practice, if the maximum height of the deflector and/or of a starting point of the conveyor wings above the carrier lying in the rotational axis is 10 to 90%, preferably 30 to 80% of the radius of the carrier or of the radius of the turning circle of the radially outermost end area of the girders or of the radius of the turning circle of the radially furthest outside point of the outermost tool. Thus, an advantageous coordination of the effect of the deflector with the effect of the conveyor wings results.

The cutting behavior is improved, if the cutting surfaces pointing in the direction of rotation and/or the working surfaces of the tools connecting to the conveyor wings are arranged along a curved line, which continues the course or the curvature of the conveyor wings and, if necessary, trails behind a radial of the carrier.

The movement of the material to be crushed or its feed to the tools and the introduction of energy into the material are put in a favorable balance, if the height of the conveyor wings decreases with regard to the level of the cutting surfaces of the tools at a distance from its starting point of 20 to 90%, preferably 25 to 80%, of the radius of the carrier, of the radius of the turning circle of the radially outermost end area of the girders or the radius of the turning circle of the radially furthest outside point of the outermost tool from the pivot point to the edge by 35 to 70%, preferably 40 to 60% and subsequently preferably decreases to the level of the cutting surface of the innermost tool.

It is advantageous for the movement of the material, if the conveyor wings are at a right angle to the surface of the carrier or that the conveyor wings are inclined with regard to the surface of the carrier over at least one section of their height at an angle of up to 45° to the carrier in and against the direction of movement.

It is constructively advantageous, if the conveyor wings are connected on their base edge near to the carrier with a base surface, if necessary, also connected with the deflector and, if necessary, are mounted with the latter on the carrier.

To improve the cutting effect of the tools it can be provided that seen in the direction of rotation the edge of the cutting surface lying radially outside or the working surface of a tool lying in each case inside covers or towers over the edge of the cutting surface lying radially inside or the working surface of the tool to be connected in each case radially outward.

The tools provided are formed from cutting knives, milling tools or the tools designated for the respective type of material. The tools extend advantageously up to the outermost edge of the carrier and tower above it.

It is advantageous for the use and the effect and the manufacture of the crushing tool, if the individual conveyor wings and/or the tools and/or the girders are in each case designed centrally symmetrically among each other and/or the same among each other.

The area, in which the conveyor wings extend, i.e. the area, which lies between the area of the deflector and the area of the tools, is advantageously demarcated in that the conveyor wings connecting to the deflector extend up to a radial distance from the pivot point, which is 30 to 70%, preferably 40 to 60%, of the radius of the carrier or of the radius of the turning circle of the radially outermost end area of the girders or of the radius of the turning circle of the radially furthest outside point of the outermost tool. Thus, a good material circulation results with optimal cutting effect through the conveyor wings moved with relatively high rotational speed, which feed the material to the tools.

It is provided according to the present invention, that the crushing tool is arranged inside the container of the cutting compactor and is supported by a rotating shaft running perpendicular to the carrier or to the plane spanned by the conveyor wings and preferably pushing through the bottom of the container. Thus, the structure and the efficiency of a cutting compactor for the processing of, particularly recycled, plastic materials, are optimized.

It is provided with such a cutting compactor, that the rotational axis of the carrier and the axis of the rotary shaft coincide.

It can be provided for an improved movement of material, that the web- or strip-like conveyor wings are inclined with respect to the carrier at an angle of up to 45° in the or against the direction of rotation.

It is useful for a rapid and congestion-free circulation of complex material, if the conveyor wings and/or the conveyor wings at least over a section of their course, in particular over their entire course, seen in cross section, possesses height ranges with different inclination to the carrier.

An embodiment of the conveyor wings which is rapid and rapidly moves and intermixes the spout in the container provides, that at least over a section of their radial course in the cross section the conveyor wings have a first length section extending over a length area of 80 to 100%, preferably 90%, of the respective total length of the conveyor wings, perpendicular to the surface of the carrier, in particular, possessing a straight course, to which a deflected section connects extending over a length area of up to 20% of the respective total length of the conveyor wing, having a straight or curved cross section, inclined against the direction of rotation at an angle of up to 45° to a perpendicular to the surface of the carrier, the apex of which lies in the deflection.

In particular, it is advantageous for special materials, if the conveyor wings at least over a section of their radial course in a cross section have a first length section extending over a length area of up to 20% of the respective total length of the conveyor wings, inclined against the direction of rotation at an angle of up to 45° with respect to a perpendicular to the surface of the carrier, running straight or having a curved cross section, if a center section extending perpendicular to the surface of the carrier over a length area of 60 to 80% of the respective total length of the conveyor wings connects to this length section, and if to this center section a deflected end section straight or curved in cross section connects over a length area of up to 20% of the respective total length of the conveyor wings, which is inclined in the or against the direction of rotation at an angle of up to 45° to a perpendicular to the surface of the carrier and has a straight or curved cross section, wherein the apex of the angle lies in the deflection.

It is important for the material processing and crushing to set the curvature or the course of the front section of the conveyor wings and the tools. At the same time, it is advantageous, if the conveyor wings emanating from their starting point and the connecting tools have a particularly consistently curved course of their leading edges and/or surfaces pointing in the direction of rotation, wherein the curvature is approximated by a circular arc with a precision of 10% of the circular arc radius and the circular arc radius is 50 to 80%, preferably 52 to 75% of the radius of the carrier or the radius of the turning circle of the radially outermost end area of the girders or of the turning circle of the radially furthest outside point of the outermost tool. A determination of the course can also be made, if the curvature of the conveyor wings emanating from their starting point is approximated by their angular distance to a leading radial, wherein emanating from the rotational axis in a distance range of 5 to 45% of the radius of the carrier or of the radius of the turning circle of the radially outermost end area of the girders or the turning circle of the radially furthest outside point of the outermost tool the angular distance is 0 to 25°, in a distance range of 15 to 90% the angular distance is 15 to 40°, in a distance range of 35 to 95% the angular distance is 30 to 55°, and in a distance range of over 65% or of 65 to 100% the angular distance is 45 to 80°, preferably 45 to 60°.

It can also be useful for the design of the conveyor wings, if the conveyor wings emanate radially from the rotational axis and up to the edge of the deflector follow the course of a straight line, which constitutes a tangent to the curvature or the course or to the front section of the connecting conveyor wings.

Figure 1:
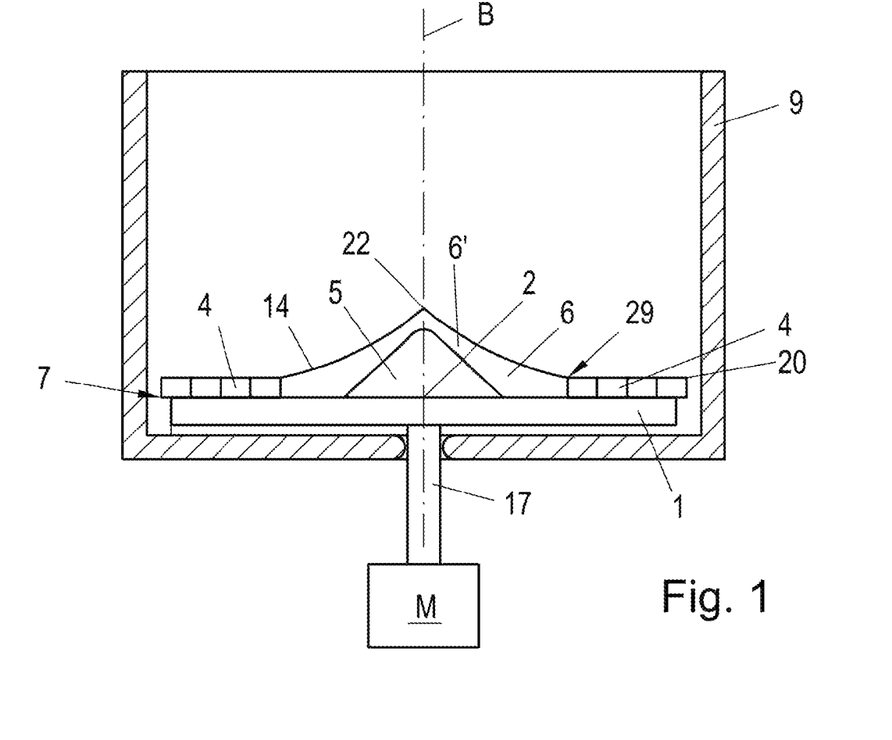
FIG. 1 shows a schematic section through a container, in which a crushing tool according to the present invention is arranged.

FIG. 1 shows a container 9, in which a crushing tool according to the present invention is mounted drivable to a rotary motion about its vertically configured rotational axis B via a shaft 17 of a motor M. In its middle area the disc-shaped carrier 1 bears a deflector 5, which is designed advantageously rotationally symmetrically to the rotational axis B of the carrier 1. From the deflector 5, conveyor wings 6 extend in the direction toward edge 7 of the carrier 1, to the end area 29 of which tools 4 connect. In the present case, the deflector 5 also bears conveyor wings 6' or conveyor wings 6' are arranged above the deflector 5. In the present case, these conveyor wings 6' are designed in one piece with the conveyor wings 6.

The conveyor wings 6' arranged above the deflector 5 and conveyor wings 6 connected to the latter can emanate from a common starting point 22, which is advantageously situated in the rotational axis B, and fall away in the direction towards the edge of the carrier 1. The height of the upper edge 14 of the conveyor wings 6 and 6', which are distant from the carrier 1, decreases from its starting point 22 lying radially inside to the level of the tool 4 or its cutting surfaces 8. The edge 14 can possess a straight or a curved course. A parabolic course can also be provided, or that the edge 14 has straight or curved sections, which follow each other in any manner.

Figure 2:
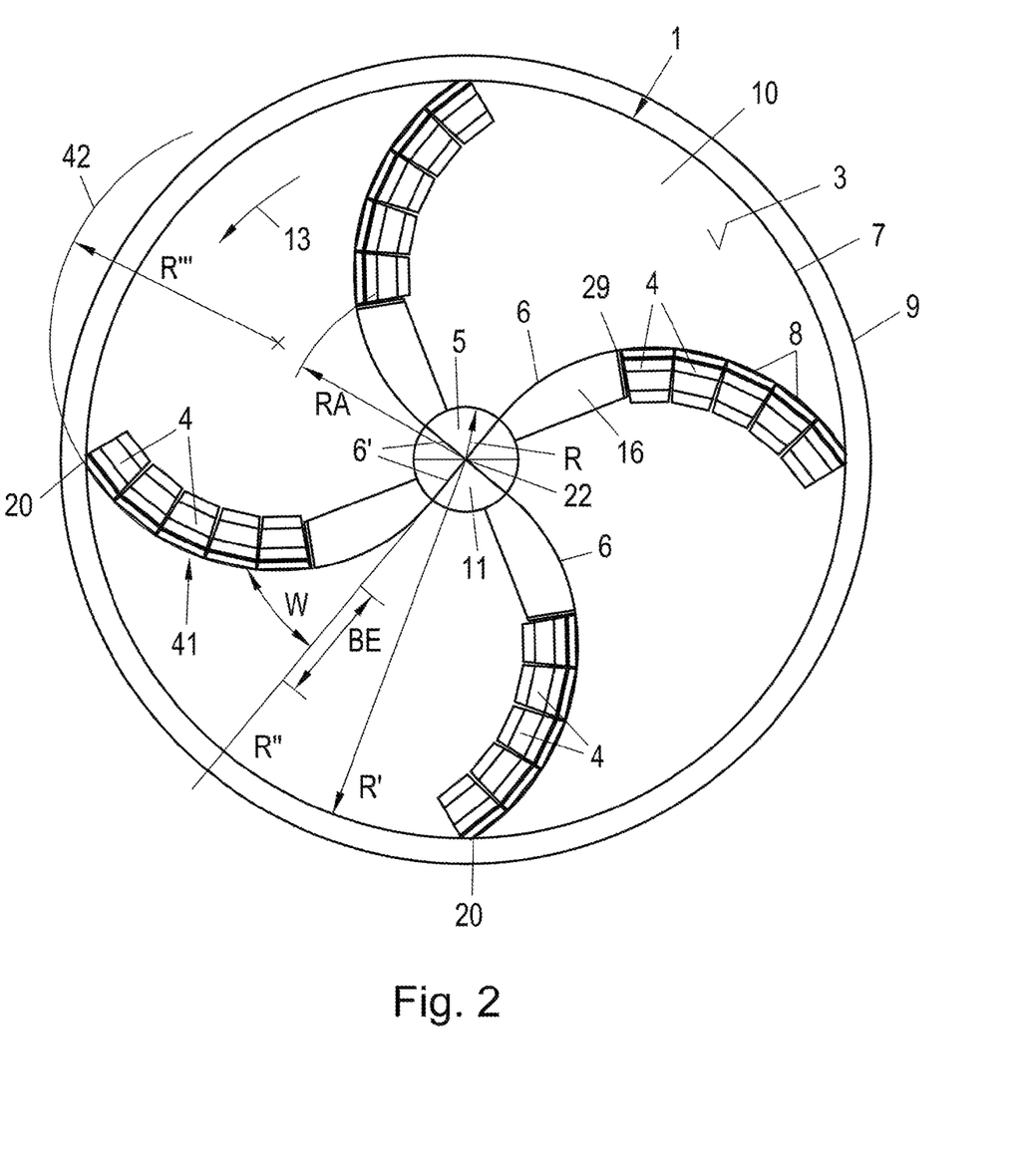
FIG. 2 shows a top view of an embodiment of a crushing tool, such as it can be used in a container according to FIG. 1.

The carrier 1 can be formed from a disc 10, just as this is depicted in FIGS. 1 and 2. However, it is also possible to form the carrier 1 such that it possesses a central carrier part 12, from which girders 11 depart, just as this is depicted in FIG. 3.

The number of girders 11 and tools 4 is selectable in the same manner as the number of the conveyor wings 6, 6' arranged on the carrier 1. Minimally, at least two conveyor wings 6 are provided with tools 4 connected thereto.

Figure 3:
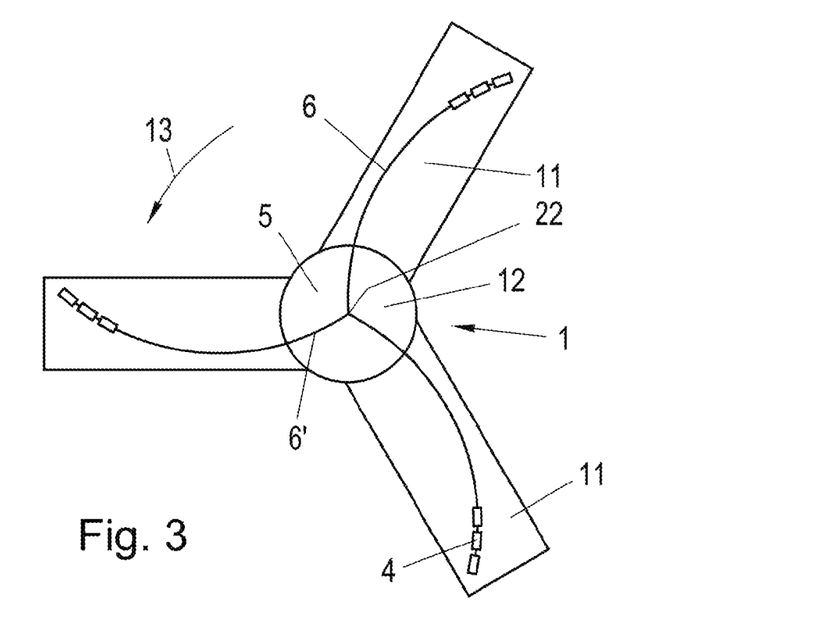
FIG. 3 shows an alternative embodiment of a crushing tool.

The crushing tool is—as FIG. 3 shows—advantageously designed centrally symmetrically.

The deflector 5 is designed conically in the case of FIGS. 1 and 3 and emanating from its center area lying in the rotational axis B or its tip 21, inclines in a sloping manner towards the edge 7 of the carrier 1.

The deflector 5 can possess a continuously closed surface or be designed from a number of struts and/or plates, which yield an advantageously rotationally symmetrical, for example, conical, structure.

Figure 4:
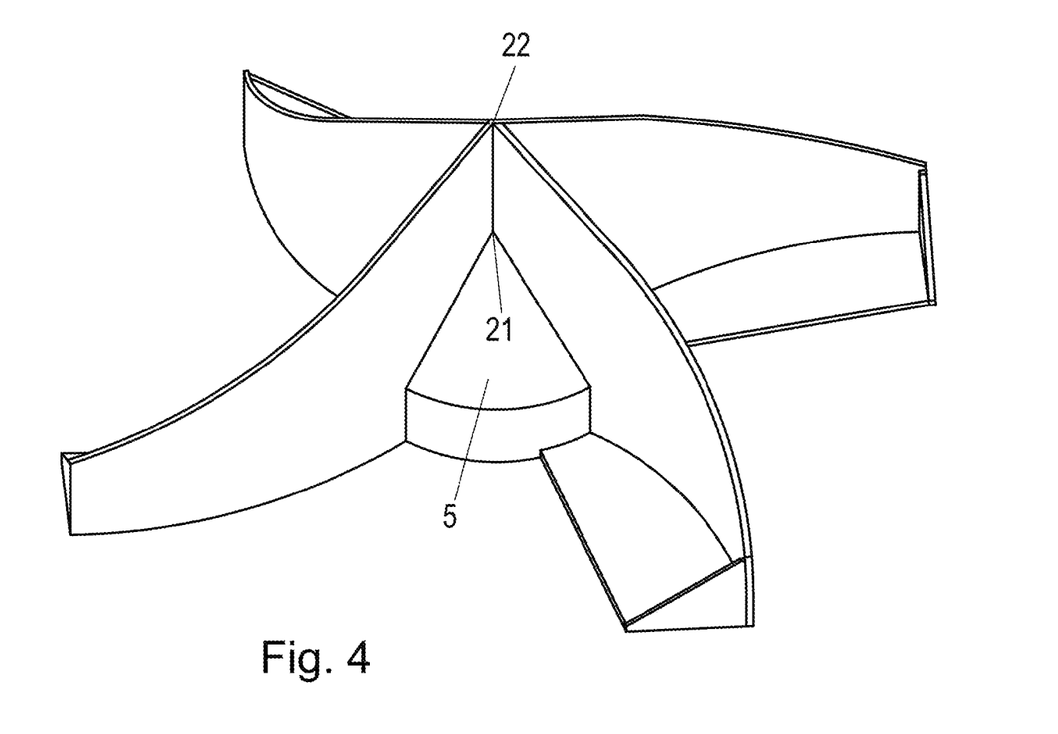
FIGS. 4, 5, 5a, 6, 7, 8 show different embodiments of crushing tools.

As is clear particularly from FIGS. 1 and 2, the conveyor wings 6' emanate from a common starting point 22, which lies in the rotational axis B of the carrier 1 at a distance above the deflector 5. This is also clear from FIG. 4, which shows a perspective view of the deflector 5 according to FIG. 1. According to FIGS. 2 and 4, four conveyor wings 6', which run above the deflector 5, emanate from this starting point 22. The conveyor wings 6 connect with the conveyor wings 6' and extend from the deflector 5 in the direction towards the edge 7 of the carrier 1. The conveyor wings 6' run straight radially; the conveyor wings 6 supported by the carrier 1 and connecting to the conveyor wings 6', are curved in a trailing manner in respect to a radial R" of the crushing tool.

It has proven to be generally advantageous for all embodiments of the invention, if the conveyor wings 6 extend from the edge of the deflector 5 up to a radial distance RA from the rotational axis B of the carrier 1, which distance RA is 30% to 70%, preferably 40% to 60%, of the radius of the carrier 1 or of the turning circle of the outermost point of the outermost tool 4 or of the end of the girders 11.

It is generally provided for all embodiments of the invention, that the deflector 5 possesses a radius R of 5 to 45%, preferably of 15 to 40%, of the radius R' of the carrier 1 or of the radius of the turning circle of the radially outermost end area of the girders 11 or of the radius of the turning circle of the radially furthest outside point 20 of the outermost tool 4.

The size of the radius R of the deflector 5 or the size of the distance RA or the height level of the conveyor wings 6, 6' is determined by the type of plastic material to be processed and the crushing desired and the desired amount of thermal energy to be introduced.

Furthermore, it can generally be provided for all embodiments, that the maximum height of the deflector 5 and/or of a starting point 22 of the conveyor wings 6' lying in the rotational axis B above the carrier 10 is 10 to 90%, preferably 30 to 80%, of the radius of the carrier 1 or of the radius of the turning circle of the radially outermost end area of the girders 11 or of the turning circle of the radially furthest outside point 20 of the outermost tool 4. This parameter can also be selected, particularly depending on the material to be processed.

The conveyor wings 6' and 6 decrease from their starting point 22 towards the edge 7 in respect to their height and end on the level of the tools 4 or on the level of the cutting surface 8 of these tools 4. In the process, it is useful, if the height of the conveyor wings 6, 6' decreases with regard to the level of the cutting surface 8 of the tools 4 at a distance from their starting point 22 from 20 to 90%, preferably from 25 to 80%, of the radius of the carrier 1, of the radius of the turning circle of the radially outermost end area of the girder 11 or of the turning circle of the radially furthest outside point 20 of the outermost tool 4 from the rotational axis B towards the edge by 35 to 70%, preferably 40 to 60%, and subsequently decreases to the level of the cutting surfaces 8 of the tools 4. By setting this parameter the conveying effect or the circulating effect of the conveyor wings 6, 6' can be adjusted and set to the plastic material to be crushed or to be processed.

One or a number of consecutively arranged tools 4 connect to the conveyor wings 6, which bear the cutting surfaces 8 and the required working surfaces. These tools or their cutting surfaces 8 essentially follow the curvature of the conveyor wings 6 and show a curved course trailing in respect to a radial R".

Figure 5:
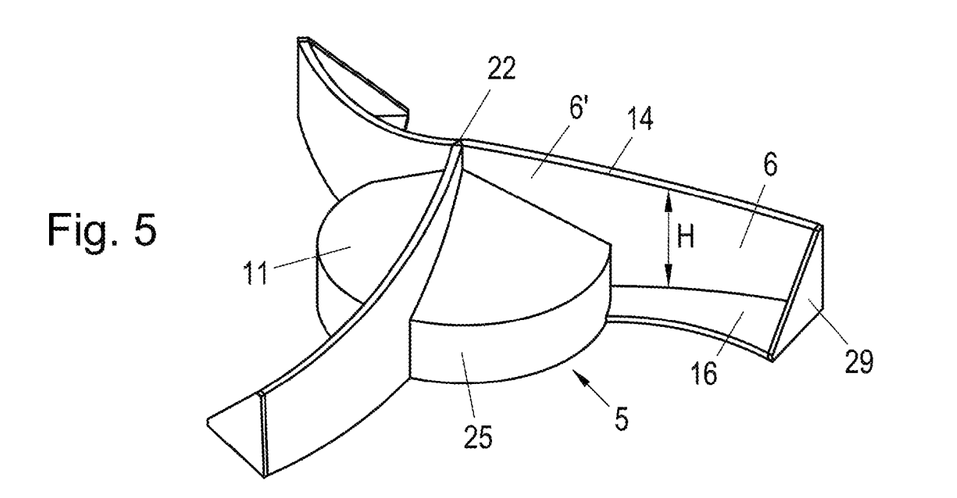
Figure 5A:
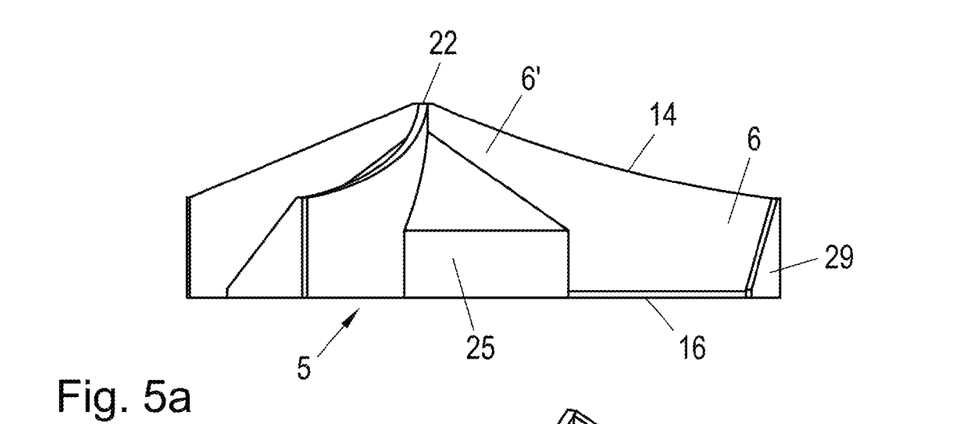

FIGS. 5 and 5a show an embodiment of a crushing tool, in which the conveyor wings 6 and 6' are designed in one piece and from their starting point 22 possess a curved course trailing in respect to the radial R" up to their end 29 close to the edge or tool. The deflector 5 possesses a cylindrical base 25, on which a rotary cone 11 is placed. The conveyor wings 6 and 6' are perpendicular to the carrier 1.

A base area 16 of the conveyor wings 6 can be used to connect the conveyor wings 6 and/or the deflector 5 with the carrier 1. FIG. 5a shows a lateral view through the crushing tool according to FIG. 5 and one sees the curved sloping, upper or carrier-distant edge 14 of the conveyor wings 6 and 6' designed in one piece.

Figure 6:
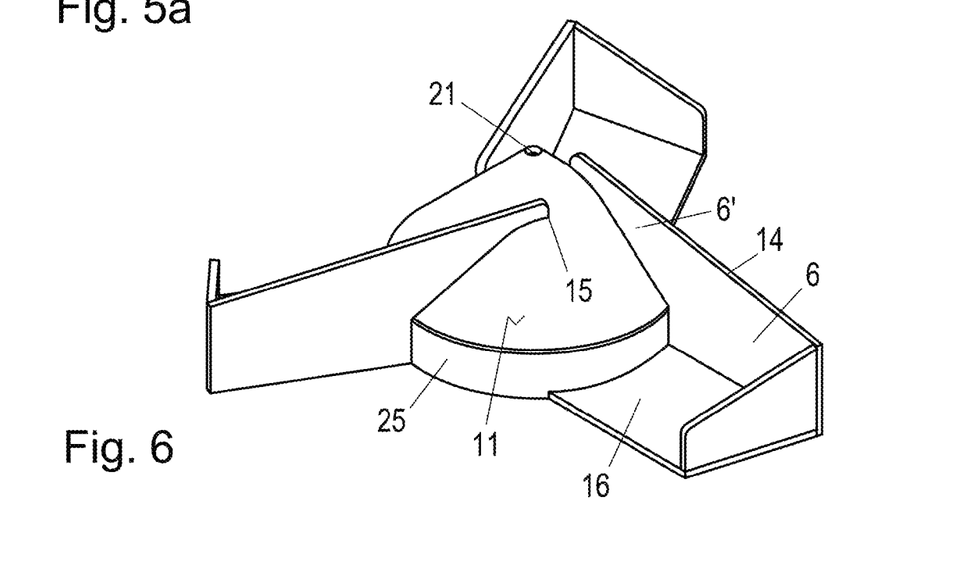

FIG. 6 shows an embodiment, in which the conveyor wings 6 are 6' are designed in one piece directly one after the other in the form of a plate. These conveyor wings 6, 6' begin at a distance from the tip 21 of the deflector 5, namely from the area 15 of the lateral surface of the cone 11, which forms a unit with the cylindrical base 25.

Figure 7:
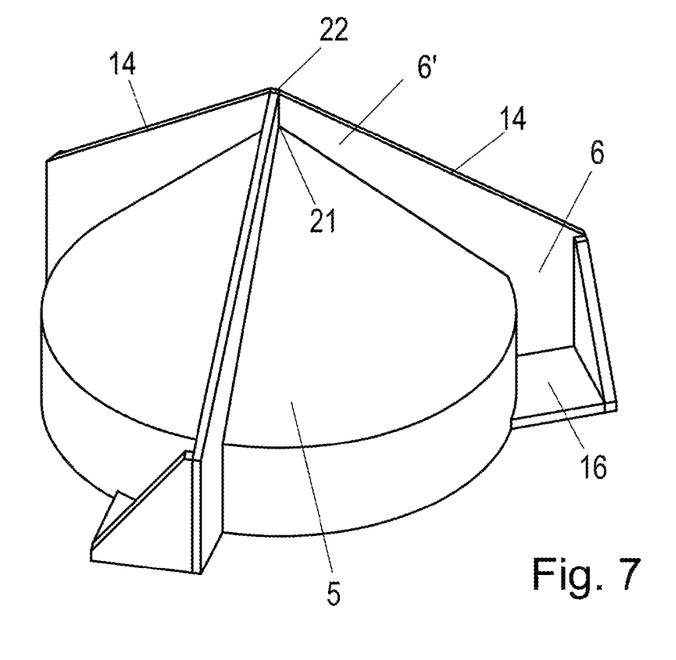

FIG. 7 shows an embodiment, in which three conveyor wings 6 and 6' designed in one piece are provided, which run in a radially directed manner from a starting point 22 lying above the tip 21 of the cone 5 and directly in the form of a plate towards the edge 7 of the carrier 1, wherein the course of the upper edge 14 of the conveyor wings follows a straight line. These conveyor wings 6, 6' are also perpendicular or approximately perpendicular to the carrier 1 like the conveyor wings depicted in the preceding figures.

Figure 8:
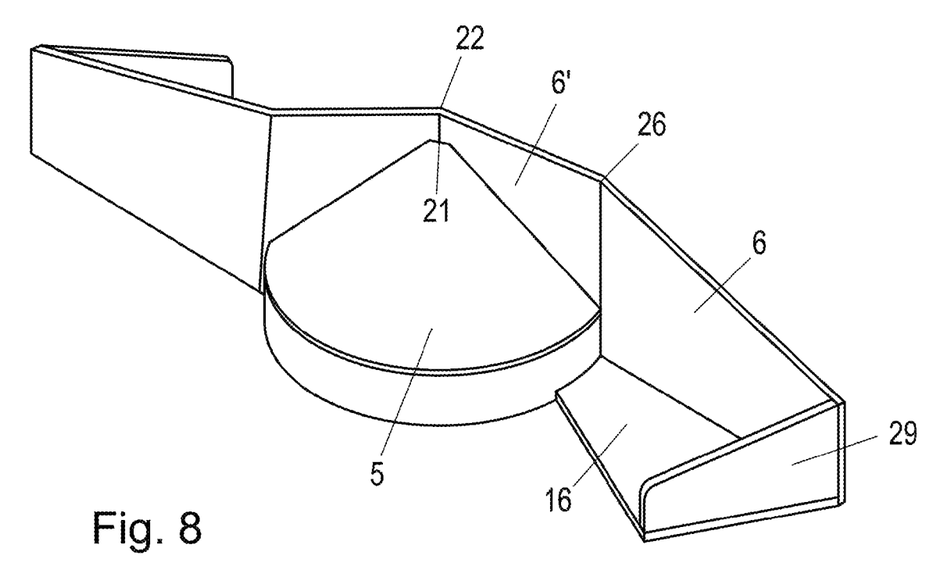

FIG. 8 shows an embodiment of a crushing tool with only two pairs of conveyor wings 6, 6'. The conveyor wings 6' run from their starting point 22 above the tip 21 of the cone 5 up to the deflector 5 and pass over with the formation of a bend 26 into the conveyor wings 6. The bend 26 is trailing in respect to the starting point 22 and the end point 29 of the conveyor wings 6 and 6' relative to the radial R".

Figure 9:
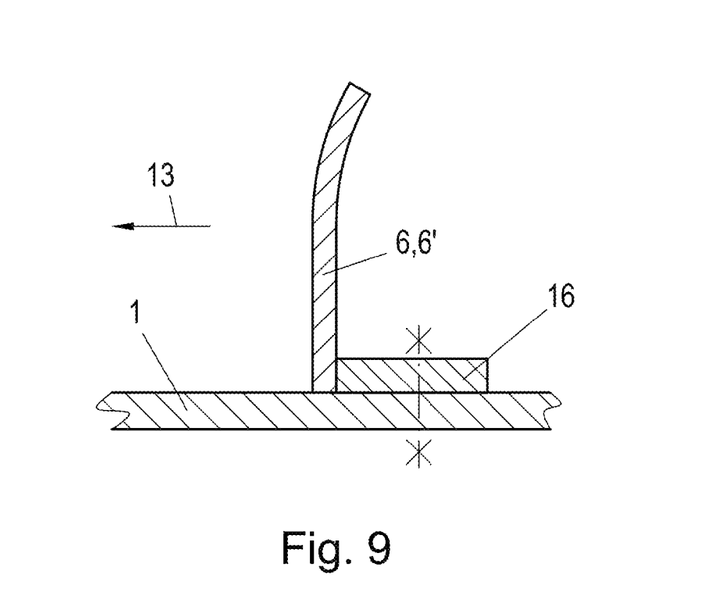
FIG. 9 shows a section through a conveyor wing.

FIG. 9 shows a section perpendicular to the course of a web- or strip-shaped conveyor wing 6 or 6'. The conveyor wings 6, 6' mounted on the carrier 1 with its base 16 are curved in their carrier-distant end region at least over a section running radially. Depending on the nature of the material to be crushed it is provided that the end area of the conveyor wing 6 and/or 6' is bent or curved in the direction of the direction of rotation 13 or against the latter.

The deflector 5 provided according to the present invention is mounted on the carrier 1, for example, screwed on, and is also provided, in order to cover the screw connection between the carrier 1 and the rotary shaft 17 in respect to the plastic material to be processed and to prevent dust and moisture from penetrating at the connecting point.

It is possible, in place of a number of tools 4 arranged one after the other to provide only one tool designed in one piece, which connects to the conveyor wings 6 and extends up to the edge 7 of the carrier 1.

Figure 10:
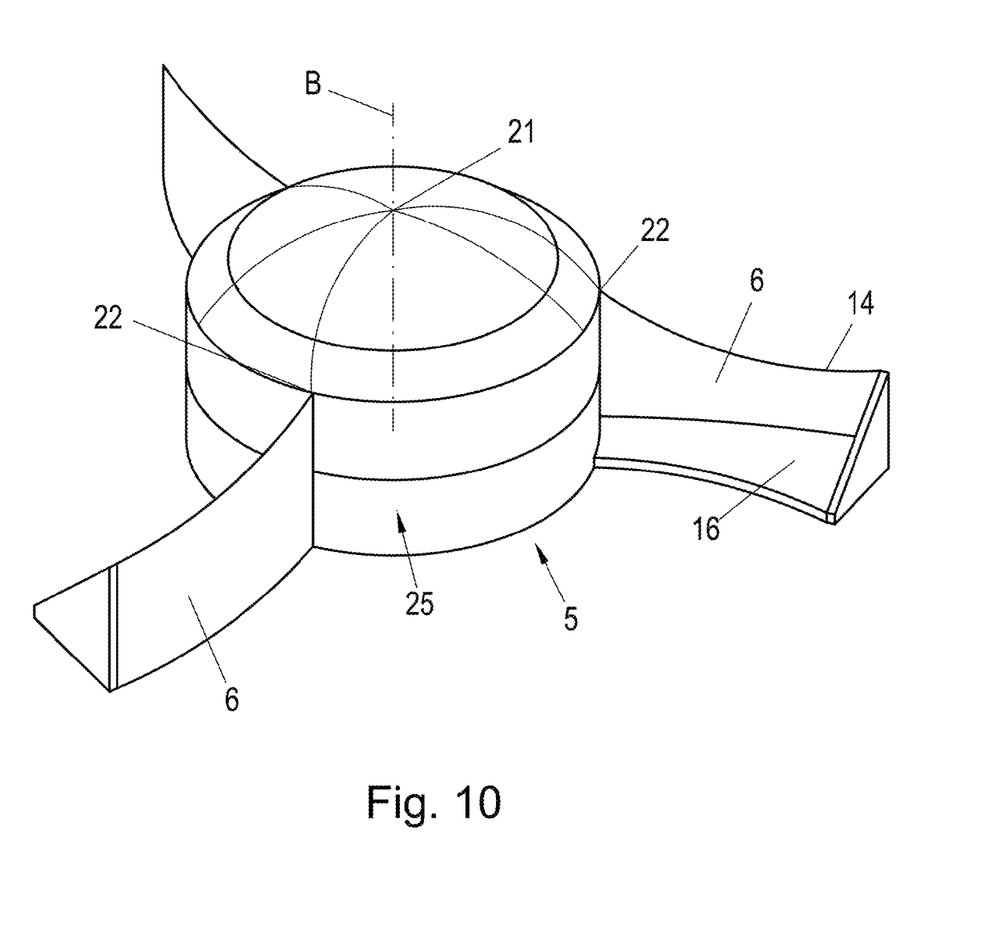
FIG. 10 shows an alternative embodiment of a deflector, which does not bear a conveyor wing.

FIG. 10 shows a deflector 5, which bears no conveyor wings 6'. The conveyor wings 6 depart from the cylindrical part 25 of the deflector directed to the edge 7 of the carrier 1. From their starting point 22, the edge 14 of the conveyor wings 6 fall away to the edge 7 of the carrier to the level of the tools 4 or to the level of the cutting surfaces 8. The starting point 22 can tower above the side wall of the cylinder 25, which is bossed on its upper side.

FIG. 11 shows different cross-sectional forms of the conveyor wings 6, 6' over their course from their starting point 22 in the direction towards the edge 7 of the carrier 1.

Figure 11A:
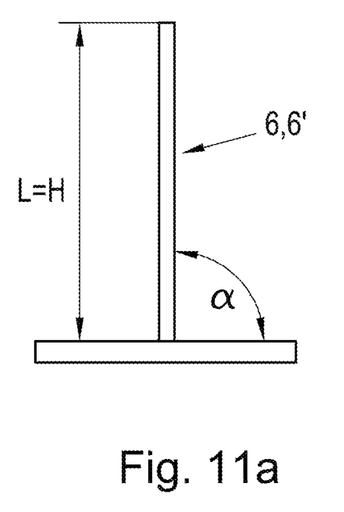
FIGS. 11a, 11b, 11c and 11d show different cross-sectional forms of conveyor wings.
Figure 11B:
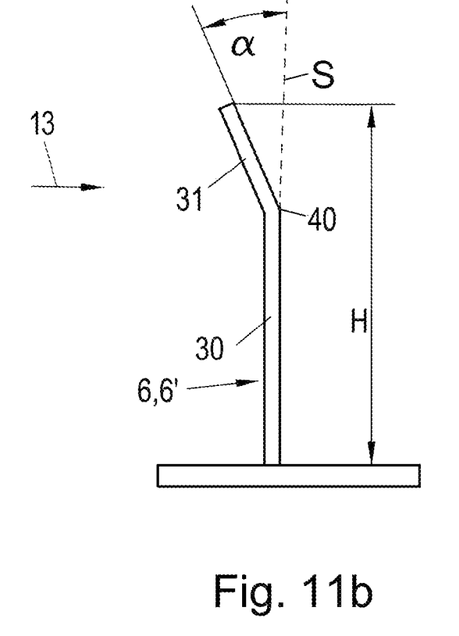
Figure 11C:
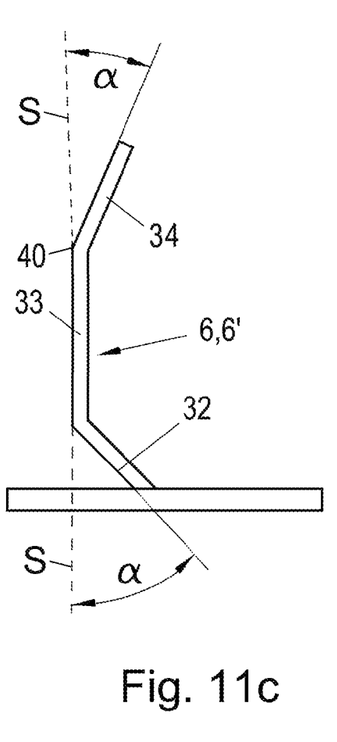
Figure 11D:
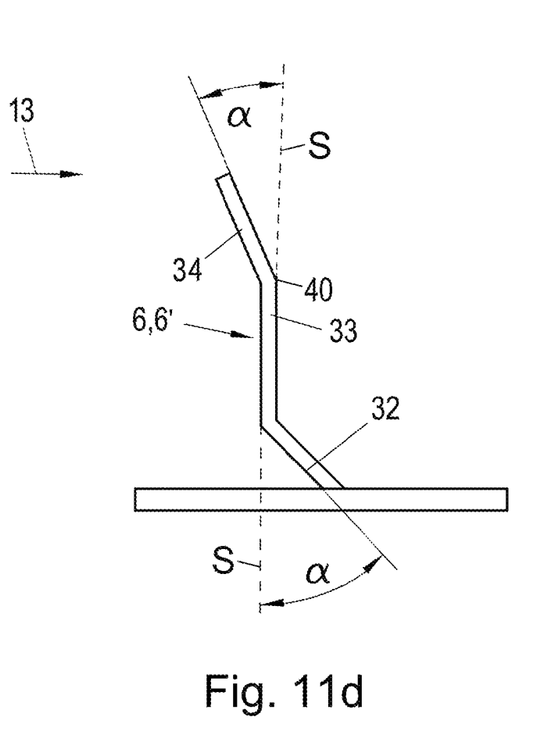

In FIG. 11*a*, the cross section of a conveyor wing 6, 6' is depicted, which sticks out from the carrier 1 at an angle α of approximately 90°, i.e., approximately perpendicular. This angle α can vary by several degrees. Such a conveyor wing 6, 6' conveys the material primarily in a radial direction towards the edge 7 of the carrier 1. In principle, it is possible, that this conveyor wing 6, 6' extends at an angle α of 45° to 135°, i.e., is inclined by 45° to as well as by 45° against the direction of motion 13. The length L of the conveyor wing corresponds in this case to its height H. In FIGS. 11*b*, 11*c* and 11*d*, bent sections exist and reference is thereby made to the total length L of the conveyor wing.

A conveyor wing 6, 6' is depicted in FIG. 11*b*, which possesses sections with different inclination seen over its height H or its entire length L. The conveyor wing 6, 6' depicted possesses a first length section 30 running perpendicular to the carrier 1, which extends over a percentage of approximately 80 to 100%, preferably 90% of the total length L of the conveyor wing 6,6'. In the carrier-distant area, a section 31 directed, in particular bent, against the direction of rotation 13, connects to this first length section 30. Section 31 extends over a length area of up to 20% of the respective length L of the conveyor wing 6, 6'. Such a conveyor wing 6, 6' conveys both radially to the carrier as well as in a direction pointing away from the carrier 1. With the length section 30 or the perpendicular S to the surface of the carrier 1, this section 31 includes an acute angle α of up to 45°, the apex of which lies in the deflection of the edge or deflection 40.

FIG. 11*c* shows a cross section through a conveyor wing 6, 6', in which a first length section 32 extends over a length area of up to 20% of the respective length L of the conveyor wing 6, 6' and is inclined against the direction of rotation 13 and includes an acute angle α of up to 45° with the perpendicular S. A center section 33 running perpendicular to the surface of the carrier 1, which possesses a length of approximately 60 to 80% of the respective length L of the conveyor wings 6, 6', connects to this length section 32 lying underneath or inside. To this center section 33, an end section 34 connects, which possesses up to 20% of the length L of the respective conveyor wing 6, 6', is inclined in the direction of rotation 13 and with the perpendicular S to the carrier 1 includes an acute angle α of up to 45°. Such a conveyor wing 6, 6' in its lower area conveys away from the carrier 1 and in its carrier-distant end section 34 towards the carrier 1. However, the length section 32 as well as the center section 33 and the end section 34 also convey in a radial direction.

FIG. 11*d* shows a conveyor wing 6, 6' just as it is depicted in FIG. 11*c*, with the modification, that the end section 34 is not inclined in the direction of rotation 13, but rather runs inclined against the direction of rotation 13. The end section 34 includes an angle α of up to 45° with the perpendicular S to the carrier 1.

The actual height H of the conveyor wings 6, 6' depends in FIG. 11*b* on the actual total length L and the angle α, with which the length section 32 and the end section 34 are inclined.

The total length L is calculated from the length of the individual sections 30 and 31 or the sections 32, 33 and 34 in FIGS. 11*c* and 11*d*.

All sections 30, 31, 32, 33 and 34 of the conveyor wings 6, 6' can display a straight or curved course. The individual sections have been created by deflection of a strip-shaped base conveyor wing. A curved section can thus be connected to each straight section through a deflection and a straight section can be connected to a curved section through a deflection.

FIG. 2 shows the radius R''' of a circular arc 42, with which the forward front 41 of the conveyor wings 6, 6' and the cutting surfaces 8 of the tools 4 can be approximated. The circular arc 42 runs through the starting point 22 of the respective conveyor wing 6, 6' and the outermost lying point 20 of the tool 4 lying furthest outside. This means that the forward front 41 of the conveyor wings 6, 6' and the tools 4 must precisely follow a circular arc; it is absolutely possible, that this course deviates from a circular arc. However, it is possible to approximate the course of the forward front 41 by specially selected circular arcs, with a precision or a maximum distance of the individual points of the forward front 41 from the circular arc 42, which amounts to 10% of the radius R''' of the circular arc 42. Thus, it is provided according to the present invention, that the conveyor wings emanating from their starting point and the connecting tools possess a preferably consistently curved course of their leading edges and/or surfaces pointing in the direction of rotation, wherein the curvature is approximated by a circular arc 42 with a precision of 10% of the radius of the circular arc and the radius of the circular arc is 50 to 80%, preferably 52 to 75%, of the radius of the carrier or of the radius of the turning circle of the radially outermost end area of the girders or of the turning circle of the radially furthest outside point of the outermost tool. The cutting surfaces 8 of the individual tools 4 can also run straight.

Another possibility for determining and establishing an optimal curvature of the conveyor wings 6, 6' and the forward front of the tools 4 is given, when the curvature of the conveyor wings emanating from their starting point is approximated by their angular distance W to a leading radial R'', wherein emanating from the rotational axis in a distance range BE of 5 to 45% of the radius of the carrier or of the radius of the turning circle of the radially outermost end area of the girders or of the turning circle of the radially furthest outside point of the outermost tool, the angular distance W is 0 to 25°, in a distance range BE of 15 to 90% the angular distance W is 15 to 40°, in a distance range BE of 35 to 95% the angular distance W is 30 to 55°, and in a distance range BE of 65 to 100% the angular distance W is 45 to 80°, preferably 45 to 60°.

In FIG. 2, a distance range BE and a possible angular distance W are indicated, which can possibly be specified for this distance range BE. The values from the individual distance ranges or for the individual angular distances in these distance ranges are selected depending on the material type and the desired processing.

In principle, the setting of the specified parameters can be achieved through arrangement of differently designed conveyor wings 6, 6' and mounting of other tools 4 in specified locations on the carrier 1.

The conveyor wings 6 can connect to the conveyor wings 6' directly or with the formation of a bend.

The invention claimed is:

1. A crushing tool for plastic materials drivable to a rotary motion, comprising:
    a carrier configured to be rotated about a rotational axis centrally located on a surface of the carrier of which tools for processing and crushing of the plastic materials are arranged;

a deflector arranged on the surface of the carrier at the rotational axis of the carrier; and
conveyor wings arranged in an area of the carrier radial from the deflector,
wherein the conveyor wings or web- or strip-shaped,
wherein the conveyor wings extend up to a radial distance from a pivot point on the surface of the carrier at the rotational axis,
wherein the radial distance is between 30% and 70% of one of a radius of the carrier, a radius of a turning circle of an end area of a girder of the carrier, or a radius of a turning circle of an outside point of an outermost tool of the tools furthest from the rotational axis, and
wherein the tools are radially arranged in an area of the carrier between the conveyor wings and an edge of the carrier.

2. A crushing tool according to claim 1, characterized in that the conveyor wings are connected to the deflector.

3. A crushing tool according to claim 1, characterized in that the tools lie between ends of the conveyor wings opposite from the rotational axis and the edge of the carrier.

4. A crushing tool according to claim 1, characterized in that at least one of the tools connects directly to the conveyor wings.

5. A crushing tool according to claim 1, characterized in that the carrier is formed by a disc, which is formed on a surface of the deflector, which bears the conveyor wings and the tools, or by a central carrier part and by a multiplicity of girders departing from this central carrier part, wherein the central carrier part supports the deflector and the conveyor wings and/or the girders support the conveyor wings, the tools and the deflector.

6. A crushing tool according to claim 1, characterized in that the deflector has a rotationally symmetrical conical, cylindrical, truncated conical, cylindrical with conical attachment, or a pyramidal outer contour or forms a cone-bearing cylinder and/or that the symmetry axis of the deflector lies in the rotational axis.

7. A crushing tool according to claim 1, characterized in that the deflector is inclined in a sloping manner from tip of the deflector lying in the rotational axis or from an area of the deflector opposite from the surface of the carrier surrounding the rotational axis towards the edge of the carrier.

8. A crushing tool according to claim 1, characterized in that the deflector possesses a continuously closed surface or a surface formed by a number of struts and/or plates forming an outer contour.

9. A crushing tool according to claim 2, characterized in that the conveyor wings departing from the deflector in the direction to the edge of the carrier depart or protrude from the surface of the carrier.

10. A crushing tool according to claim 1, characterized in that the deflector bears second conveyor wings which depart from a surface of the deflector and extend away from the carrier.

11. A crushing tool according to claim 10, characterized in that the second conveyor wings and the conveyor wings placed between the deflector and the tools are connected directly to each other or are designed in one piece with each other.

12. A crushing tool according to claim 11, characterized in that a starting point of the second conveyor wings and the conveyor wings connecting to the second conveyor wings lies in the rotational axis of the carrier or in a center of the deflector or in an area between the rotational axis or the center of the deflector and an edge of the deflector at a given distance from the rotational axis.

13. A crushing tool according to claim 10, characterized in that the second conveyor wings in the area above the deflector in a direction towards the edge of the carrier have a straight or a curved course trailing from starting points of the second conveyor wings in respect to a radial line extending from the rotational axis and/or that the conveyor wings extending between the deflector and the edge of the carrier have a straight or trailing course in respect to the radial line.

14. A crushing tool according to claim 10, characterized in that a height of the conveyor wings and the second conveyor wings decreases above the carrier from starting points of the conveyor wings and the second conveyor wings up to a height of the tools, which connects to the respective conveyor wings.

15. A crushing tool according to claim 10, characterized in that a edge of the conveyor wings and the second conveyor wings in relation to the surface of the carrier have straight, parabolic, or curved courses.

16. A crushing tool according to claim 10, characterized in that the conveyor wings and/or the second conveyor wings at least over a section of their course define variable heights with different inclination to the carrier.

17. A crushing tool according to claim 1, characterized in that the deflector has a radius of 5% to 45% of the radius of the carrier, the radius of the turning circle of the end area of the girders, or the radius of the turning circle of the outside point of the outermost tool.

18. A crushing tool according to claim 10, characterized in that a maximum height of the deflector and/or of a starting point of the second conveyor wings above the carrier lying in the rotational axis is 10% to 90% of the radius of the carrier, the radius of the turning circle of the end area of the girders, or the radius of the turning circle of the outside point of the outermost tool.

19. A crushing tool according to claim 1, characterized in that cutting surfaces of tools pointing in a direction of rotation and/or working surfaces of tools connecting to the conveyor wings are arranged along a curved line, which continues a course or curvature of the conveyor wings.

20. A crushing tool according to claim 1, characterized in that a height of the conveyor wings decreases with regard to a level of cutting surfaces of the tools at a distance from starting points of the conveyor wings of 20% to 90% of the radius of the carrier, the radius of the turning circle of the end area of the girders, or the radius of the turning circle of the outside point of the outermost tool from the rotational axis towards the edge by 35% to 70% and subsequently decreases to a level of the cutting surface of the tools.

21. A crushing tool according to claim 1, characterized in that the conveyor wings are at a right angle to the surface of the carrier or that the conveyor wings are inclined with regard to the surface of the carrier at an angle of up to 45° over at least at one section of a height of the conveyor wings.

22. A crushing tool according to claim 1, characterized in that the conveyor wings are connected on their base edge close to the carrier with a base surface, connected with the deflector, and are mounted with the deflector on the carrier.

23. A crushing tool according to claim 1, characterized in that conveyor wings and/or the tools and/or the girders are designed centrally symmetrically among each other and/or the same among each other.

24. A crushing tool according to claim 1, characterized in that at least over a section of radial courses of the conveyor wings, the conveyor wings have a first length section extending over a length area of 80% to 100% of respective total lengths of the conveyor wings, perpendicular to the surface of the carrier, possessing a straight course to which a deflected section connects extending over a length area of up to 20% of the respective total length of the conveyor wing, inclined against a direction of rotation, which includes an angle of up to 45° with a perpendicular to the surface of the carrier.

25. A crushing tool according to claim 1, characterized in
   that the conveyor wings at least over a section of radial courses of the conveyor wings have a length section extending over a length area of up to 20% of respective total lengths of the conveyor wings, inclined against a direction of rotation of the carrier, which includes an angle of to 45° with a perpendicular to the carrier,
   that a center section extending perpendicular to the surface of the carrier connects to this length section over a length section of 60% to 80% of the respective total length of the conveyor wings, and
   that to this center section a deflected end section connects over a length area of up to 20% of the respective total length (L) of the conveyor wings, which is inclined in the and against the direction of rotation and includes an angle of up to 45° with a perpendicular to the surface of the carrier.

26. A crushing tool according to claim 1, characterized in that the conveyor wings emanating from starting points and the tools have a curved course of leading edges and/or surfaces pointing in a rotation direction of the carrier, wherein the curvature is approximated by a circular arc with a precision or with a maximum distance of 10% of a circular arc radius and the circular arc radius is 50% to 80% of the radius of the carrier, the radius of the turning circle of the end area of the girders, or the turning circle of the outside point of the outermost tool.

27. A crushing tool according to claim 1, characterized in that the conveyor wings emanate radially from the rotational axis and up to the edge of the deflector follow the course of a straight line, which constitutes a tangent to a curvature or a course or to a front section of connecting conveyor wings.

28. A crushing tool according to claim 1, characterized in that the curvature of the conveyor wings emanating from starting points of the conveyor wings is approximated by their angular distances of the conveyor wings to a leading radial, wherein emanating from the rotational axis in a distance range of 5% to 45% of the radius of the carrier, the radius of the turning circle of the end area of the girder, or the turning circle of the outside point of the outermost tool the angular distance is 0° to 25°, in a distance range of 15% to 90% the angular distance is 15° to 40°, in a distance range of 35% to 95% the angular distance is 30° to 55°, and in a distance range of 65% to 100% the angular distance is 45° to 80°.

29. A cutting compactor comprising the crushing tool according to claim 1.

30. A cutting compactor according to claim 29, characterized in that the crushing tool is arranged inside a container of the cutting compactor and is borne by a rotary shaft running perpendicular to the carrier or to a plane spanned by the conveyor wings and pushing through a bottom of the container.

31. A cutting compactor according to claim 29, characterized in that the rotational axis of the carrier and an axis of the rotary shaft coincide.

32. A crushing tool for plastic materials drivable to a rotary motion, comprising:
   a carrier configured to be rotated about a rotational axis centrally located on a surface of the carrier of which tools for processing and crushing of the plastic materials are arranged;
   a deflector arranged on the surface of the carrier at the rotational axis of the carrier; and
   conveyor wings arranged in an area the carrier radial from the deflector,
   wherein the conveyor wings or web- or strip-shaped, and
   wherein the web- or strip-like conveyor wings are inclined with respect to the carrier at an angle of up to 45° in or against a direction of rotation of the carrier.

* * * * *